(12) United States Patent
Blewett et al.

(10) Patent No.: US 8,195,462 B2
(45) Date of Patent: Jun. 5, 2012

(54) SYSTEM AND METHOD FOR PROVIDING LARGE VOCABULARY SPEECH PROCESSING BASED ON FIXED-POINT ARITHMETIC

(75) Inventors: Charles Douglas Blewett, Madison, NJ (US); Enrico Luigi Bocchieri, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1088 days.

(21) Appl. No.: 11/276,151

(22) Filed: Feb. 16, 2006

(65) Prior Publication Data

US 2007/0192104 A1   Aug. 16, 2007

(51) Int. Cl.
*G10L 15/14* (2006.01)
*G10L 15/28* (2006.01)

(52) U.S. Cl. ......... 704/256; 704/250; 704/255; 704/242
(58) Field of Classification Search ................... 704/256, 704/230, 250, 255, 242
See application file for complete search history.

(56) References Cited

U.S. PATENT DOCUMENTS

| | | | | |
|---|---|---|---|---|
| 4,922,537 A * | 5/1990 | Frederiksen | | 704/212 |
| 5,349,687 A * | 9/1994 | Ehlig et al. | | 704/231 |
| 5,388,181 A * | 2/1995 | Anderson et al. | | 704/200.1 |
| 5,657,350 A * | 8/1997 | Hofmann | | 375/241 |
| 6,032,111 A * | 2/2000 | Mohri | | 704/9 |
| 6,092,045 A * | 7/2000 | Stubley et al. | | 704/254 |
| 6,243,679 B1 * | 6/2001 | Mohri et al. | | 704/256.8 |
| 6,502,073 B1 * | 12/2002 | Guan et al. | | 704/255 |
| 6,574,597 B1 * | 6/2003 | Mohri et al. | | 704/251 |
| 6,587,844 B1 * | 7/2003 | Mohri | | 706/20 |
| 7,165,030 B2 * | 1/2007 | Yi et al. | | 704/238 |
| 7,292,976 B1 * | 11/2007 | Hakkani-Tur et al. | | 704/236 |
| 2002/0198706 A1 * | 12/2002 | Kao et al. | | 704/230 |
| 2003/0110033 A1 * | 6/2003 | Sheikhzadeh-Nadjar et al. | | 704/243 |
| 2005/0110790 A1 * | 5/2005 | D'Amora | | 345/419 |
| 2006/0095260 A1 * | 5/2006 | Cho et al. | | 704/243 |

OTHER PUBLICATIONS

Delaney, "A low-power, fixed-point, front-end feature extraction for a distributed speech recognition system", IEEE, ICASSP, 2002.*
Rabiner, "A Tutorial on Hidden Markov Models and Selected Applications in Speech Recognition", Proceedings of the IEEE, vol. 77, No. 2, Feb. 1989.*
J. Leppänen, et al., "Comparison of Low Footprint Acoustic Modeling Techiques for Embedded ASR Systems", Multimedia Technologies Laboratory, Nokia Research Center, Tampere, Finland, Interspeech 2005, Sep. 4-8, Lisbon, Portugal; p. 2965-2968.
M. Vasilache, "Speech Recognition Using HMMS With Quantized Parameters", Speech and Audio Systems Laboratory, Nokia Research Center, Tampere, Finland.

(Continued)

*Primary Examiner* — Jialong He (57) ABSTRACT

Disclosed herein is a system, method and computer-readable medium storing instructions for controlling a computing device according to the method. The invention relates to a system, method and computer-readable medium storing instructions for controlling a computing device according to the method. As an example embodiment, the method uses a speech recognition decoder that operates or uses fixed point arithmetic. The exemplary method comprises representing arc costs associated with at least one finite state transducer (FST) in fixed point, representing parameters associated with a hidden Markov model (HMM) in fixed point and processing speech data in the speech recognition decoder using fixed point arithmetic for the fixed point FST arc costs and the fixed point HMM parameters. The method may also include computing at the decoder sentence hypothesis probabilities with fixed point arithmetic as type Q-2e numbers.

15 Claims, 4 Drawing Sheets

OTHER PUBLICATIONS

E. Bocchieri, et al., "Subspace Distribution Clustering Hidden Markov Model", IEEE Transactions on Speech and Audio Processing, vol. 9, No. 3, Mar. 2001; pp. 264-275.

S. Sagayama, et al., "On the Use of Scalar Quantization for Fast HMM Computation", NTT Human Interface Laboratories, Japan, 0-7803-2431-5/95 $4.00 © 1995 IEEE; pp. 213-216.

S. Kanthak, et al., "Using SIMD Instructions for Fast Likelihood Calculation in LVCSR", University of Technology, Germany, 0-7803-6293-4/00/$10.00 ©2000 IEEE; pp. 1531-1534.

M. Mohri, et al. "Weighted Finite-State Transducers in Speech Recognition", Article submitted to Computer Speech and Language, AT&T Labs—Research, pp. 1-26.

* cited by examiner

SYSTEM AND METHOD FOR PROVIDING LARGE VOCABULARY SPEECH PROCESSING BASED ON FIXED-POINT ARITHMETIC

BACKGROUND OF THE INVENTION

1. Field of the Invention

The present invention relates to a system and method of providing large vocabulary speech processing and more specifically to providing speech processing such as automatic speech recognition based on fixed-point arithmetic.

2. Introduction

Large-vocabulary continuous-speech recognition (LVCSR) finds wide use in consumer, military and industrial applications using embedded platforms, such as PDA's, telephone handsets, network appliances, and wearable computers. Often a speech recognition module is part of an overall spoken dialog system that includes various modules to receive speech from a user, recognize the speech (via a speech recognition module), understand the meaning of the speech or the intent of the user (via a spoken language understanding module), formulate responsive text (via a dialog management module) and generate responsive speech (via a text-to-speech module). These and variations of these modules are known in the art for carrying out a natural language spoken dialog with a person. Some systems may not utilize all of these modules but only utilize one or two, such as just providing speech recognition to convert speech to text.

An example application is in Short Message Service (SMS) that has an expected global volume in excess of 1,000 billion messages in 2005. LVCSR on embedded platforms presents a unique set of challenges. In particular, to lower hardware cost and power consumption, for longer battery life and miniaturization, the CPU's on small portable devices do not have floating-point arithmetic units. However their computational power is constantly increasing, which motivates the study of methods of enabling speech recognition on smaller devices. Traditionally, larger computers and servers have hardware floating point units either in the CPU or in separate floating point processor chips. Accordingly, what is needed in the art is an improvement that enables highly compute intensive algorithms such as those utilized in speech processing to be able to function on smaller devices, such as portable computing devices, that do not have the computing power or size to perform floating point operations.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides a fixed-point decoding approach to speech processing modules. Previous work on fixed-point decoding concern either small-vocabulary continuous-speech tasks or large-vocabulary tasks with deterministic grammars. Instead, the present inventors present fixed-point algorithms for LVCSR, including word N-gram language models, frame-synchronous beam-search Viterbi decoder and HMM likelihood computation. The concepts disclosed herein provide floating-point systems in LVCSR experiments on various tasks, with different feature extraction front-ends. The fixed-point parameters do not require task-dependent or feature-dependent calibrations. Experiments are run on the Darpa Switchboard task and on fluently spoken telephone speech from an AT&T customer care application, with up to fifty words/sentence. Even for these long utterances, the accumulation of log-likelihoods scores during fixed-point decoding is not problematic. An example target computing device for the present invention is a 32-bit integer CPU's (e.g. StrongARM), but the approach may be suitable for 16-bit CPU's with 32-bit accumulators as well or other varieties of CPUs that can utilize the features of the invention. However, any computing device is contemplated for use with this invention.

The increasing computational power of embedded CPU's motivates the implementation of highly accurate large-vocabulary continuous-speech (LVCSR) algorithms in fixed-point arithmetic, to achieve the same performance on the device as on the server. Disclosed herein are example algorithms for the fixed-point implementation of the frame-synchronous beam-search Viterbi decoder, HMM likelihood computation, and language models (including word N-grams), that yield the same accuracy as floating-point recognizer in LVCSR experiments on the DARPA Switchboard task and on an AT&T proprietary task. Experiments are presented on the DARPA Resource Management task, performed in an embedded system based on the StrongARM-1100 206 MHz CPU.

The invention relates to a system, method and computer-readable medium storing instructions for controlling a computing device according to the method. As an example embodiment, the method uses a speech recognition decoder that operates or uses fixed-point arithmetic. The exemplary method comprises representing arc costs associated with at least one finite-state transducer (FST) in fixed-point, representing parameters associated with a hidden Markov model (HMM) in fixed-point and processing speech data in the speech recognition decoder using fixed-point arithmetic for the fixed-point FST arc costs and the fixed-point HMM parameters. The method may also include computing at the decoder sentence hypothesis probabilities with fixed-point arithmetic as type Q-2e numbers.

In another aspect of the invention, the method relates to performing speech processing by generating a fixed-point speech recognition transducer by converting a floating point speech recognition transducer via quantization into a fixed-point format, receiving input speech to the fixed-point speech recognition transducer and generating a best hypothesis of the received input speech using the fixed-point speech recognition transducer. The idea is to represent the "cost" of the speech recognition transducers as fixed-point numbers in a Q-2e format, where "e" is a specified parameter, and to accumulate the decoder log-likelihoods as Q-2e numbers.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention. Embodiments may include a system (portable computing device, laptop, computer server, computer cluster or grid, etc.)

Figure 1:
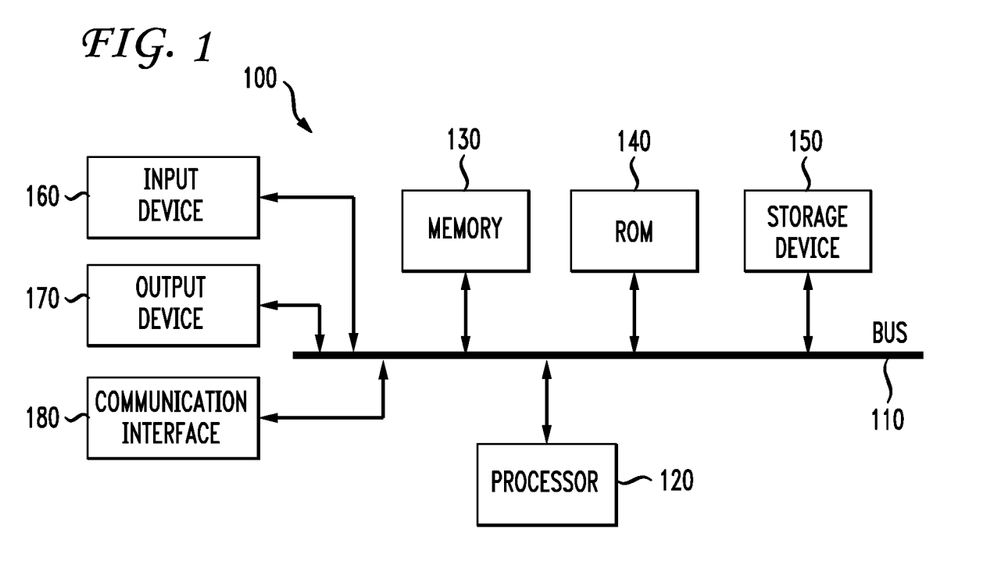
FIG. 1 illustrates an example system embodiment of the invention.

FIG. 1 illustrates a block diagram of an exemplary processing device 100 which may be used to implement systems and methods consistent with the principles of the invention. Processing device 100 may include a bus 110, a processor 120, a memory 130, a read only memory (ROM) 140, a storage device 150, an input device 160, an output device 170, and a communication interface 180. Bus 110 may permit communication among the components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive. In some implementations consistent with the principles of the invention, storage device 150 may store and retrieve data according to a database management system.

Input device 160 may include one or more conventional mechanisms that permit a user to input information to system 200, such as a keyboard, a mouse, a pen, a voice recognition device, a microphone, a headset, etc. Output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate via a network. For example, communication interface 180 may include a modem, or an Ethernet interface for communicating via a local area network (LAN). Alternatively, communication interface 180 may include other mechanisms for communicating with other devices and/or systems via wired, wireless or optical connections.

Processing device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Processing device 100 may be, for example, a personal computer (PC), or any other type of processing device capable of creating and sending messages. In alternative implementations, such as, for example, a distributed processing implementation, a group of processing devices 100 may communicate with one another via a network such that various processors may perform operations pertaining to different aspects of the particular implementation.

We now turn to the details of the invention and introduce the decoding problem and a fixed-point representation usable with the present invention. Most dialog systems have a floating point implementation of ASR. In a fixed-point implementation, the program's dynamic range of arithmetic operation is smaller. Therefore, one issue is to make sure that a range of different quantities that are manipulated, for example added or multiplied, in a quantization process will stay within the dynamic range. So wherever there is quantization, the invention preserves enough precision so essentially so that the system does not lose accuracy in the computation.

In general, a fixed-point number representation in computing is a real data type for a number that has a fixed number of digits after the decimal binary or radix) point. Fixed-point numbers are useful for representing fractional values in native two's complement format if the executing processor has no floating point unit (FPU) or if fixed-point provides improved performance. Most low cost embedded processors do not have an FPU. The bits to the left of the radix point are magnitude bits that represent integer values, the bits to the right of the radix point represent fractional values. Each fractional bit represents an inverse power of 2. Thus the first fractional bit is ½, the second is ¼, the third is ⅛ and so on.

A floating-point number is a digital representation for a number in a certain subset of the rational numbers, and is often used to approximate an arbitrary real number on a computer. In particular, it represents an integer or fixed-point number (the significand or, informally, the mantissa) multiplied by a base (usually 2 in computers) to some integer power (the exponent). When the base is 2, it is the binary analogue of scientific notation (in base 10).

Figure 2:
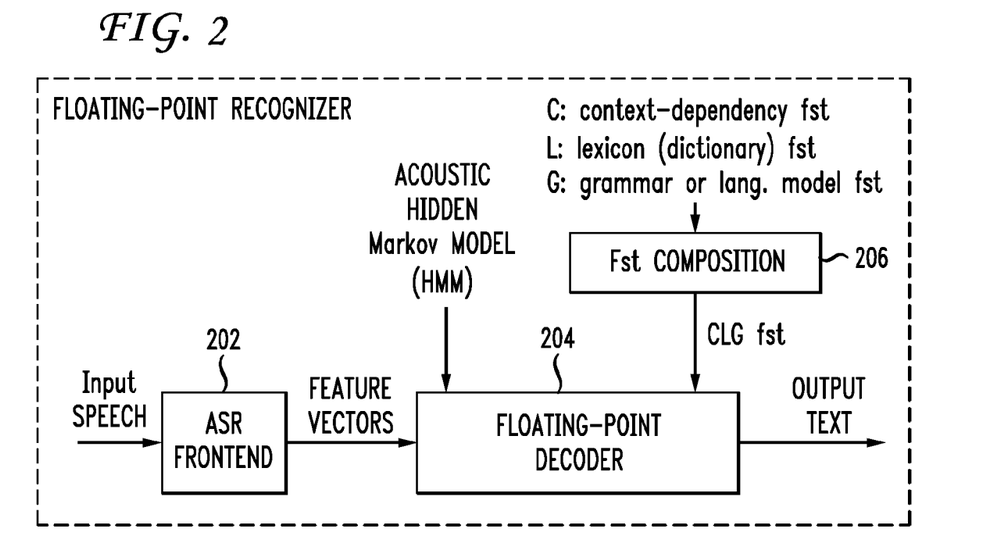
FIG. 2 illustrates the automatic speech recognition (ASR) system in floating-point.

FIG. 2 shows the implementation of a floating-point recognizer that transcribes "input speech" into "output text", discussed for background information. The ASR frontend 202 computes from the input spoken speech (typically a sentence of seconds in duration) a sequence of feature (or observation) vectors, typically at a rate of 100 vectors/second. Therefore, each vector can be thought as representing the input speech over a duration of 10 msec. FIG. 2 shows that the sequence of observation vectors is fed into the decoder 204 that in turn outputs the corresponding text sentence. Even though a language can be thought as composed by linguistic units (phonemes), the pronunciation of phonemes is affected by speaker dialect, accent, gender, age and emotion as well as other factors such as background noise and acoustic environment. It is also affected by the phonetic context in which the phoneme is pronounced (co-articulation or context-dependency). Phonemes are pronounced with varying durations, depending on the speech rate. Therefore, the operation of the decoder is fairly complex: the decoder cannot map directly the feature vectors (acoustic measurements of speech) into phonemes and then into words and sentences, for example using a simple table look-up scheme. Instead, the decoder 204 evaluates a multitude of possible text sentences (sentence hypotheses), and it selects the "best" hypothesis that "most likely" corresponds to the input feature vector sequence. The decoder 204 computes the likelihood of a text sentence given the input feature vectors using various speech models shown in FIG. 2. Intuitively, the acoustic HMM provides the likelihood of a feature vector being generated as a (portion of a) phoneme (HMM state). These likelihoods are combined in the decoding process, to provide the likelihood of the entire sentence hypothesis.

Figure 4:
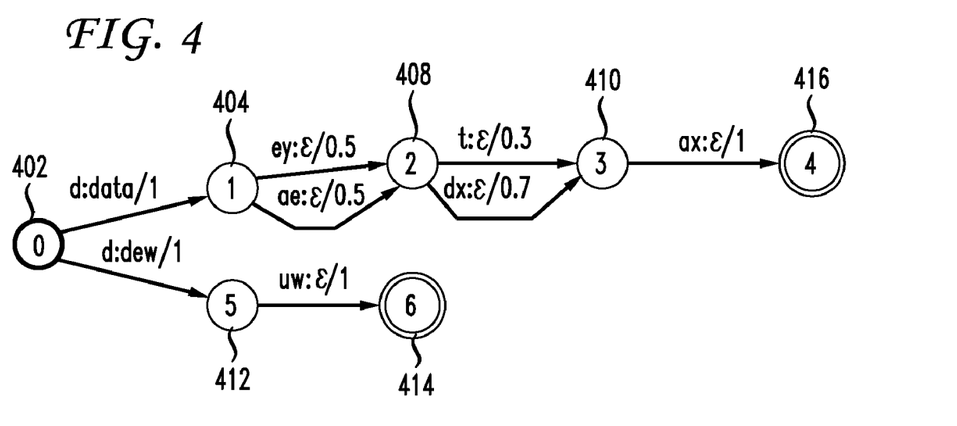
FIG. 4 illustrates the L (lexicon) FST.
Figure 5:
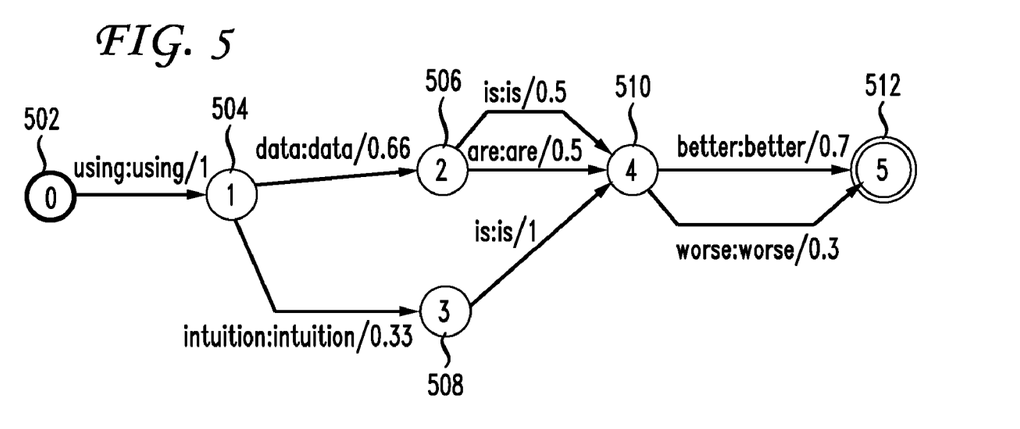
FIG. 5 illustrates the G grammar or language model) FST.
Figure 6:
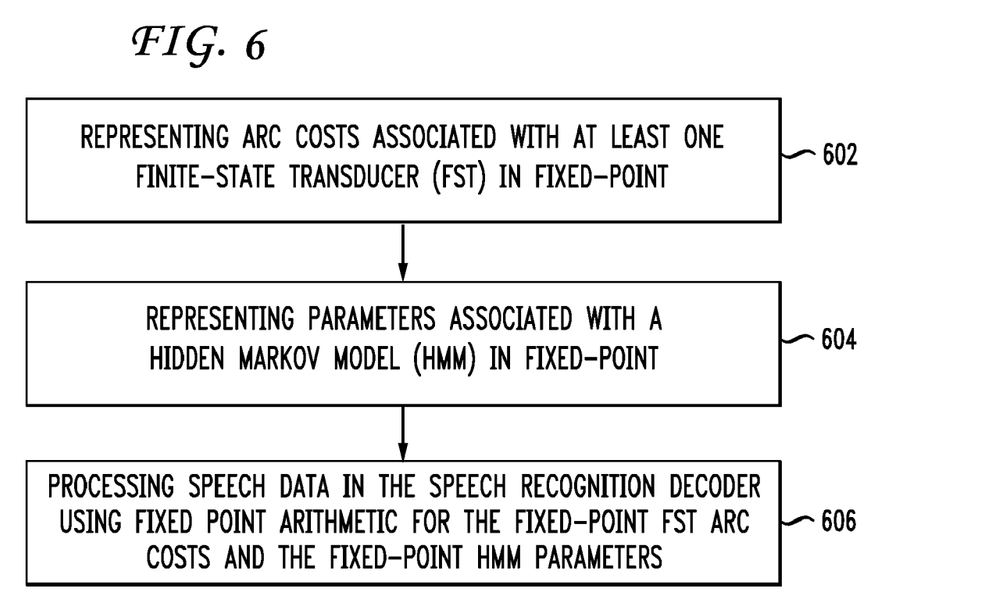
FIG. 6 illustrates a method embodiment of the invention.
Figure 7:
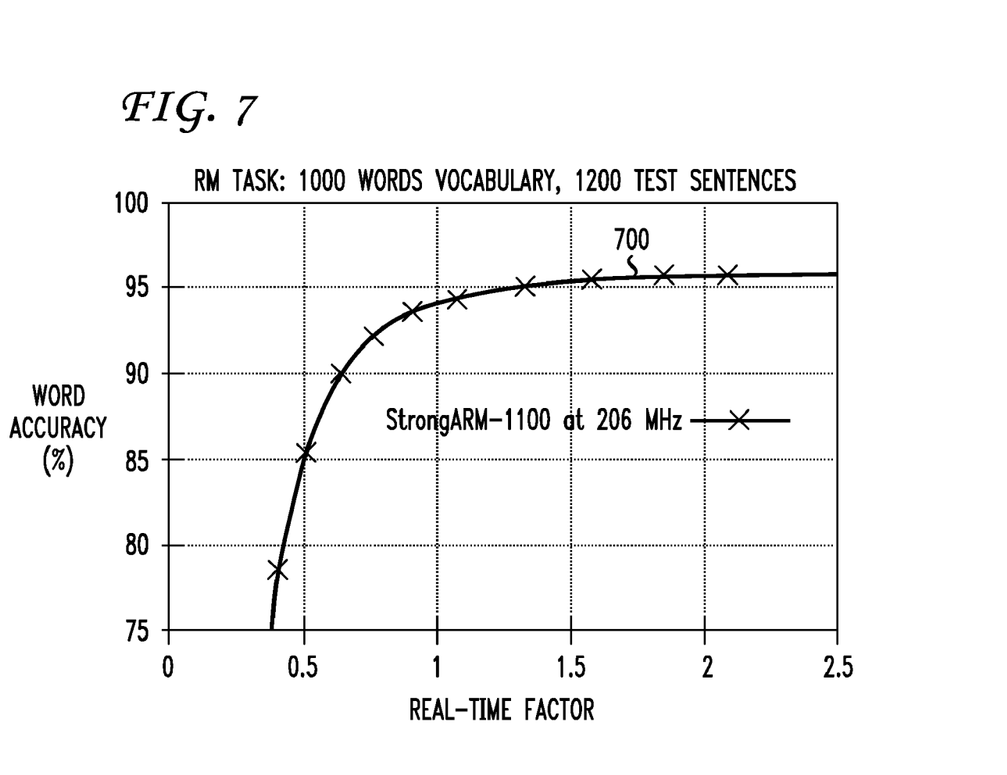
FIG. 7 illustrates an accuracy versus recognition time on a CPU.

For this purpose, the decoder uses the C,L,G finite state transducers (FST's) as described in the paper M. Mohri, F. Periera, and M. Riley, "Weighted finite-state transducers in speech recognition," Computer, Speech and Language, pp. 16(1): 69-88, 2002, incorporated herein by reference. Informally, an FST is a directed graph consisting of "nodes" (or states) connected by "arcs". There are designated "initial" and "final" states. Allowed paths or arc sequences must begin from the initial state and terminate in a final state. A generic arc may have an "input" and "output" symbol. In the FST operation, a sequence of symbols is matched against the input symbols of the transducer arcs thus producing a certain arc sequence or path. The arc sequence induces a sequence of output symbols, thus a "transduction" of input symbols into output symbols. Arcs may have probability scores (often "costs" or negative-log-probabilities), that allow for the computation of the likelihood of sequences of input/output symbols. In the application of FST's to ASR, the L (lexicon or dictionary) FST is designed so that the sequences of arcs (with phonemes as input symbols) correspond to the pronunciation of words (arc output symbols). Therefore, L describes how words consist of phonemes, and it allows to transform phoneme sequences into words. FIG. 4 shows a L transducer for the words "dew" and "data". The path from the initial "0" state, to the final state "6", represents the word "dew" as the sequence of phonemes "d" and "uw". The different paths from state "0" to final state "4" represent different pronunciations of the word "data", like for example the phoneme sequence "d", "ae", "dx", "ax". The probabilities of the L transducer arcs, allows the decoder to compute the probability of different pronunciations of "data". Note the states 402, 404, 408, 410, 412, 414, and final states 414 (if the word is "dew") and 416 (if the word is "data"). The G grammar or language model) FST uses words as arc input symbols, with paths that correspond to the word sequences allowed by the particular ASR application. For example, the G transducer of FIG. 5 shows the sentence "using intuition is better" as grammatical, because there is a path from the initial state "0" 502 to the final state "5" 512 with arc input labels that match the sentence words. The arc costs of the G transducer allow for the computation of the probability of the sentence, e.g. "using intuition is better" in FIG. 5. Note states 504, 506, 508 and 510 in FIG. 5. Language model transducers for general English are complex structures that may contain millions of arcs. An important phenomenon in spoken language is that the pronunciation of a phoneme is affected by the adjacent phonemes (co-articulation). In the ASR field co-articulation is modeled by the C FST that transforms sequences of input context-dependent phonetic symbols into the linguistic phonemes.

In summary, the C FST transforms a sequence of context dependent phonetic symbols in phonemes, the L FST transforms the phonetic sequence into words, and the G FST allows for the word sequences that are grammatical in the ASR application. In the ASR field, the FST "composition" operator 206 in FIG. 2 is used to combine the C, L, G FST's into a single CLG FST that transforms directly sequences of context dependent phonetic symbols into grammatical sentences. Therefore, the CLG transducer can be used by the decoder 204 to derive the probability of sentence hypotheses from the probabilities of the input feature vectors, as provided by the acoustic hidden Markov model (HMM for the different phonemes. The decoder 204 then outputs the sentence hypothesis with the highest probability (or lowest cost). As can be appreciated, the basic principles here can apply outside of speech processing contexts. The formal mathematical equations known to the ASR practitioners are summarized next.

Using an LVCSR map decoder, given an observation sequence $o=(o_1, \ldots o_T)$, the maximum a-posteriori decoded word sequence $\Omega=(\omega_1, \ldots \omega_M)$ is chosen to maximize $p(\Omega|o) p(\Omega)$. Those of skill in the art will recognize the well known steps to perform this process:

$$\hat{\Omega} = \arg\max_{\Omega} \mathcal{F}(\Omega), \text{ with decoding function } \mathcal{F}: \quad (1)$$

$$\mathcal{F} = \ln(\mathcal{L}) + \alpha \ln(\mathcal{A}) + \beta \ln(\mathcal{D}),$$

$\mathcal{L}$: likelihood of language model, $\mathcal{A}$: likelihood of the HMM states (acoustic model), $\mathcal{D}$: likelihood of the HMM state durations, $\alpha, \beta$: state and state-duration model multipliers The inventors encode the language model probabilities by the arc costs of a C o L o G transducer. A finite-state transducer is a finite automaton whose state transitions are labeled with both input and output symbols. A path through the transducer encodes a mapping from an input symbol sequence to an output symbol sequences. These transitions can also have weights associated with them in addition to the input and output symbols. These weights may encode probabilities, durations, penalties or any other quantity that can accumulate along a path to compute an overall weight associated with a mapping of an input sequence to an output sequence. For more background information, see the Mohri and Periera paper incorporated above and M. Mohri, "Weighted Finite-State Transducer Algorithms An Overview", In Carlos Martin-Vide, Victor Mitrana, and Gheorghe Paun, editors, *Formal Languages and Applications*, volume 148, VIII, 620 p. Springer, Berlin, May, 2004, both papers incorporated herein by reference. The C o L o G transducer comprises "C" represents a context-dependency transducer from context-dependent phones to context-independent phones, and "G" is a grammar and "L is a pronunciation lexicon. The C o L o G transducer represents the language model, either a word N-gram or a deterministic grammar, the lexicon, with pronunciation probabilities, and the phonetic context dependencies. For generality, by in (L), the inventors denote the negative total cost of the transducer path, induced by $\Omega$:

$$\ln(\mathcal{L}) = -\sum_{arc \in path(\Omega)} cost_{arc} \quad (2)$$

Next is discussed the HMM state likelihoods. The generic HMM state "s" is a weighted mixture of N, Gaussians with diagonal covariances ($\sigma$ denotes the vector of stdv's):

$$P(o \mid s) = \sum_{i=1}^{N_s} \omega_{s,i} \mathcal{N}(o; \mu_{s,i}, \sigma_{s,i})$$

$$\approx \max_{i=1,N_s} \omega_{s,i} \mathcal{N}(o; \mu_{s,i}, \sigma_{s,i})$$

Given the sequence $S=(s_1, \ldots, s_T)$ of states aligned to o, the total state likelihood contribution to (1) is $\alpha \ln(A)$:

$$\sum_{t=1}^{T} \frac{\alpha}{2} \max_{i=1,N_{s_t}} \left( 2c_{s_t,i} + \sum_{j=1}^{d} \left( (o_t^j - \mu_{s_t,i}^j) \sigma_{s_t,i}^{j-1} \right)^2 \right) \quad (3)$$

d: feature vector dimension $o_t^j, \mu_{s,i}^j, \sigma_{s,i}^j$: $j^{th}$ component of $o_t, \mu_{s,i}, \sigma_{s,i}$ $c_{s,i}$: $\ln(\omega_{s,i}) - \sum_{j=1}^{d} \ln(\sigma_{s,i}^j \sqrt{2\pi})$ The state duration model is discussed next. The inventors denote with $p(\delta|\psi)$ the probabilities of the duration of δ-frames for state ψ. They are estimated (assuming state independence) as gamma p.d.f's, and stored in look-up tables. Given the states $\Psi=(\psi_1, \ldots \psi_\Theta)$ with durations $\Delta=(\delta_1, \ldots \delta_\Theta)$, the contribution of the duration model to (1), is:

$$\beta \ln(\mathcal{D}) = \beta \ln(P(\Delta \mid \Psi)) \quad (4)$$

$$= \sum_{\theta=1}^{\Theta} \beta \ln(p(\delta_\theta \mid \psi_\theta))$$

Using fixed-point arithmetic, a decimal number x is stored in a computer word as an integer, where the $p_x$ least-significant bits contain the fractional part of x, and the most-significant bits the integer part. This representation is said to have Q-$p_x$ format. This is a particular format used for manipulating binary data using fixed-point arithmetic. In general, the choice of $p_x$ is a trade-off between truncation errors and overflow problems. Fixed-point arithmetic is based on integer operations. In z=x±y, the relation $p_x = p_y = p_z$ applies. The product z=x×y is in format Q-$(p_x+p_y)$. Arithmetic shifts may be used to change the Q fixed-point format to reduce truncation errors and to avoid overflow. While using the Q fixed-point format is preferable, other fixed-point number representations may be used in connection with the invention.

In the floating-point recognizer (FIG. 2) equations (1-4) are computed with floating-point numbers. The process of decoding speech with fixed-point numbers can be exemplified by FIG. 3, where "quantizers" transform the HMM parameters and FSM costs into a fixed-point representation, and where the decoding equations (1-4) are computed in fixed-point.

Next is discussed further fixed-point arithmetic and linear quantization. The function nearest_integer ($2^p$ x) gives the Q-p fixed-point format of decimal x. Suppose that one wants to quantize the range of decimal values [a, b], using m bits, e.g. to the range of integers $[-2^{m-1}, 2^{m-1})$. The following is an example procedure that could be followed:

TABLE 1

Fixed-point parameters m, υ and e.

i. Optional. Demean decimal values, by subtracting $\frac{a+b}{2}$:

$$[a, b] \Rightarrow \left[ -\frac{a+b}{2}, \frac{a+b}{2} \right]$$

ii. Find the largest integer p, such that
  $-2^{m-1} \leq 2^p x < 2^{m-1}$, $x \in [a,b]$
iii. Quantize $x \in [a,b]$ by y = nearest_integer($2^p$ x).
  m: bits for the d quantizers of means $\mu_{s,i}^j$, j = 1, d.

υ: bits for the d quantizers of $\sigma_{s,i}^{j-1}$, j = 1, d.

e: fixed-point Q-e format for normalized error: $(o_t^j - \mu_{s_t,i}^j) \sigma_{s_t,i}^{j-1}$
    and Q-2e format for:
    HMM state log-likelihoods.
    Acoustic duration model log-likelihoods,
    C o L o G fsm costs,
    Cumulative log-probabilities during decoding.
    and related parameters. such as beam threshold Step iii in the procedure above yields a fixed-point format of x with scale-invariant average truncation error, because of the choice of p in ii.

The core concepts of the invention are discussed next for a fixed-point implementation of a decoding function. These ideas relate to the fixed-point implementation of the decoding function for applications such as speech processing. This may apply to any of the speech processing modules discussed above or to any other basic transducers or modules. By way of example, the implementation will be discussed with reference to speech recognition. The inventors' fixed-point design of (1) is parametrized by e, m, and v, as summarized in Table 1 above. A role in the state likelihoods (3) is played by, for example, the Mahalanobis distance, $$\sum_{j=1}^{d} \left( (o_t^j - \mu_{s_t,i}^j) \sigma_{s_t,i}^{j-1} \right)^2 \quad (5)$$

and, its fixed-point format is specified preferably as Q-2e. Since (3) accumulates (5) into the state log-likelihoods, an example representation of all the decoder log-likelihoods is preferably in the Q-2e format. Other formats may be utilized as well. Therefore, the HMM log-terms $2c_{s,i}$ in (3), are also Q-2e, and, the product by α/2 maintains the Q-2e format through an appropriate arithmetic shift. Similarly, the duration log-probabilities of (4) are Q-2e fixed-point, and when multiplying by β, the Q-2e format is maintained by arithmetic shift.

Also, the cost$_{arc}$ of (2) are converted to the Q-2e format. Note that, in the fixed-point composition C o L o G, a simple integer addition implements the ⓧ operator in the tropical semiring, under the condition that the costs of the C, L and G are all Q-2e. Thus, instead of quantizing the costs of the CLG FST (as in FIG. 3), one can quantize the costs of the individual C, L, G FST's, and use the delayed composition feature referenced in the Mohri and Pereira article above as implemented in the floating-point decoder. This feature minimizes run-time memory and is useful in applications such as various embedded speech recognition platforms.

Different approaches are suitable for the implementation of (5) in Q-2e fixed-point. For example, one way is to square and accumulate terms:

$$(o_i^j - \mu_{s_t,i}^j) \sigma_{s_t,i}^{j^{-1}}, \text{ in Q-e format,} \quad (6)$$

that are computed using suitable integer representations of the HMM parameters. To account for the different dynamic ranges of the Gaussian mean components, one way to perform this is to build a quantizer for every $j^{th}$ (=1,d) component, as in i, ii and iii referenced above for the decimal range:

TABLE 2

Pseudo-code for fixed-point implementation of (5)

$$\left[ \min_{\text{Gaussian i, state s}} \mu_{s,i}^j, \max_{\text{Gaussian i, state s}} \mu_{s,i}^j \right]$$

sum = 0, j = 1
while(j ≦ d) {
    tmp = $\left( o_i^j - \mu_{s_t,i}^j \right) \sigma_{s_t,i}^{j-1}$ // Q − ($p^j + r^j$)
    tmp = tmp >> shift$_j$ // change to Q-e
    sum = sum + tmp*tmp //sum is Q-2e
    j = j + 1
}

Parameter m specifies the number of bits of the quantizers. The inventors denote by Q-$p^j$ the fixed-point format of $\mu'_{s,i}$ induced by the $j^{th}$ quantizer, which also defines the fixed-point format of $o'_i$, in (6). Similarly, one way to build another set of d quantizers, one for every $\sigma_{s,i}^{j-1}$ (the $j^{th}$ inverse stdv component) is using steps ii and iii referenced above. Parameter v specifies the number of bits, output range [0, $2^v$), of these quantizers. The inventors denote by Q-$r^j$ the fixed-point format of $\sigma_{s,i}^{j-1}$, induced by its quantizer. The fixed-point format of the integer product (6) is therefore Q-($p^j+r^j$), that is changed to Q-e with a right arithmetic shift of shift$_j$=($p^j+r^j$−e) bits, as shown in Table 2 (negative shift$_j$ implies a left shift). In practice, e, m and v can be chosen so that shift$_j$≧0, j=1, d. It might also be worthwhile for higher computational speed, to implement (5) through multiply-add operations. Other ways of implementing the approaches above than those presented.

FIG. 2 illustrates a method embodiment of the invention. An exemplary method relates to processing data associated with speech processing. The method uses a speech recognition decoder that operates or uses fixed-point arithmetic. The exemplary method comprises representing arc costs associated with at least one finite-state transducer (FST) in fixed-point (602), representing parameters associated with a hidden Markov model (HMM in fixed-point (604) and processing speech data in the speech recognition decoder using fixed-point arithmetic for the fixed-point FST arc costs and the fixed-point HMM parameters (606). The method may also include computing at the decoder sentence hypothesis probabilities with fixed-point arithmetic as type Q-2e numbers. The term "representing" is a broad term which encompasses may aspects of how to represent parameters, such as processing data so that the parameters may be represented in a certain format, performing computations on data such that the data may be represented in a certain format, applying a look-up table, or any other conceptual way of arriving at a result of having parameters that are in the particular format.

Other aspects of this method include features such as the method being applied for large vocabulary automatic speech recognition, although other contexts as well may be applied. The HMM is preferably a phonetic context-dependent acoustic HMM and the at least one FST may be either one of a single CLG FST or distinct C, L and G FSTs.

Representing arc costs that are associated with at least one finite-state transducer (FST) in fixed-point may further comprise converting floating-point costs of the at least one FST to fixed-point by quantization. In another aspect of the invention, representing parameters associated with a hidden Markov model (HMM in fixed-point may involve converting HMM state observation probability density functions to fixed-point format by quantization and computing HMM state likelihoods as Q-2e fixed-point numbers. Representing parameters associated with a hidden Markov model (HMM in fixed-point may also comprise converting HMM state duration probabilities to fixed-point by quantization using a fixed-point format of type Q-2e.

Another aspect of the invention involves a method comprises generating a fixed-point speech recognition transducer by converting a floating point speech recognition transducer via quantization into a fixed-point format, receiving input speech to the fixed-point speech recognition transducer and generating a best hypothesis of the received input speech using the fixed-point speech recognition transducer.

The invention utilizes existing typical algorithms associated with speech processing such as an automatic speech recognition module, and applies the concepts herein to the main components such as the HMM and language models to quantize costs and other parameters within these components to obtain a suitable fixed-point representation of the speech processing components. Speech processing can then be applied to the new fixed-point speech processing components and tested to insure that their accuracy is acceptable relative to the floating point versions. The best sentence hypothesis is returned. In the case of speech recognition, after the conversion of the modules occurs, the system will use HMM and language models applying a fixed-point computation.

The quantization process involves applying algorithms to a language model and an HMM to represent in fixed-point the costs associated with different hypothesis with different word sequences. The acoustic model with its mean and variance parameters and Gaussian weighting components are also represented in fixed-point. During recognition, the decoder instructs the HMM to provide likelihood values for the input speech and these values are computed in fixed-point using fixed-point arithmetic. Similarly during recognition, the decoder instructs the language model to return the likelihood of word sequences, which response is provided as fixed-point numbers. The decoder accumulates these numbers to test different hypothesis of sentences and come up with the best fit.

The speech decoder algorithm is preferably a Viterbi algorithm (which may or may not utilize floating point numbers) but the computation of word hypothesis or sentence hypothesis scores is performed in fixed-point.

An HMM comprises a series of states and there are typically three states for each phoneme. If one considers the states as a subunit of a phoneme, a state model represents the probability of the duration of the states or the probability of a portion of a phoneme to have a particular duration. It is these states or the probabilities of the duration of these states that is quantized in the process of conversion to fixed-point. For example, in an HMM, the context dependent phonemes may each be represented by three states. For example, different states may represent an initial portion of a phoneme, a middle and a last portion of phonemes. The transition between states corresponds to the duration of a phoneme which also relates to how long the speech is aligned with a particular state. So the duration with a speech aligned or assigned to a particular state is associated with a probability.

The HMM is represented by Gaussian mixture models shown in equation (3) above. The probabilities of a certain instant of speech belonging to a certain state are given by equation (3) as well. These states are connected in various ways and speech assigned to a certain duration delta which relates to the probability of that delta depends on the state and the expression of that is provided in equation (4).

The inventors also experimented to prove the concepts above. Important to the design is the fixed-point representation of (6), whose statistics are largely independent of the ASR task: after HMM maximum likelihood estimation (6) are Gaussians with zero mean and unit variance. The concept is that the decoder fixed-point parameterization does not need task-specific calibrations, which can be verified in recognition tests on:

RM: Darpa Naval Resource Management, with word-pair grammar, speaker-independent task, SBCC: fluent telephone speech from a customer-care application, with word tri-gram language model (perplexity of 60), vocabulary of 7,000 words, and up to 50 words/sentence, SWBD: Darpa Switchboard task, tested on the 2003 real-time test set (recognition from first-pass only), with feature types:

MFCC: mel-frequency cepstrum coefficients,

PLP: perceptual linear prediction cepstra, and with feature transformations:

DD: cepstra with $1^{st}$ and $2^{nd}$ differentials, 39 components,

HDA: discriminative linear transformation, 60 components,

VTLN: vocal tract length normalization.

TABLE 3

Floating and fixed-point decoder accuracy. Fixed-point parameters: e = 5, m = v = 8

| ASR System | Word Accuracy (%) | |
|---|---|---|
| | Floating | Fixed |
| RM_MFCC-HDA_ML | 96.4 | 96.4 |
| RM_MFCC-DD_ML | 95.7 | 95.6 |
| RM_PLP-DD_ML | 95.6 | 95.5 |
| SBCC_MFCC-HDA-VTLN_MMI | 80.5 | 80.6 |
| SBCC_MFCC-HDA_MMI | 78.4 | 78.4 |
| SWBD_MFCC-HDA_MMI | 59.2 | 59.1 |
| SWBD_MFCC-HDA_ML | 56.7 | 56.5 |
| SWBD_PLP-HDA_ML | 55.7 | 55.6 |

The HMMs are, for example, context-dependent triphonic models, estimated either by maximum likelihood (ML) or maximum mutual information (MMI). Training of the SBCC and SWBD HMM's use 170 and 300 hours of audio, respectively. For example, the $1^{st}$ pass of the AT&T RT-03 Switchboard system, with MFCC features and discriminative transformation, and MMI-trained HMM, is denoted by SWBD_MFCC-HDA_MMI. Table 3 shows that the accuracies of the fixed-point and the floating-point recognizers (equal beam width), are the same, within 0.1%, for all tasks. Means and variances can be linearly quantized to 5 bits, without significant loss of accuracy (Table 4). Additional compression may be obtained by nonlinear quantization, at the cost of additional indirections in the computation. The inventors wanted to quantize HMM means and variances to no more than 8 bits, to reduce the HMM memory storage to a relatively small fraction of total run-time memory use. The accuracy is unchanged (within 0.1%) for 1<e<7 (Table 4). Accuracy suffers from truncation errors for e≦1, and from overflow problems for e≧7. Larger e's require normalization of the cumulative log-likelihoods in the Viterbi search. In any case, the decoder operates correctly over a wide range of e. The fixed-point experiments on the Switchboard and SBCC tasks were run on a Pentium processor (32-bit integers); but the good performance for e as small as 2, suggests that the implementation is suitable for 16-bit CPU's with 32-bit accumulators.

The inventors benchmarked the RM task on a StrongARM-1100, running at 206 MHz, embedded in a desk-top telephone set prototype, with 30 Mbytes of RAM, and Linux 2.6.6.

Figure 3:
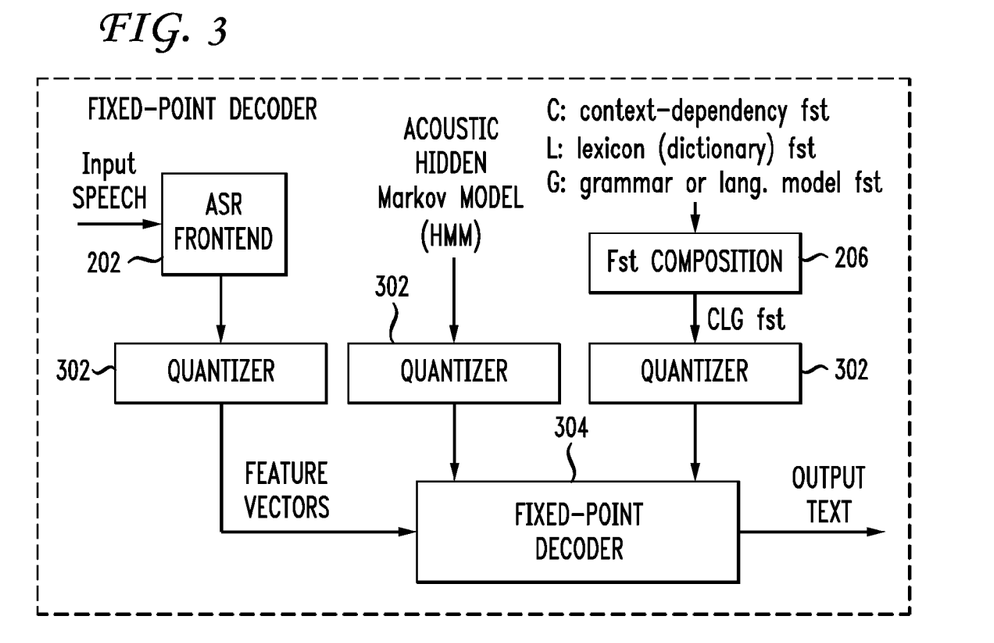
FIG. 3 illustrates the ASR system in fixed-point.

StrongARM executables are cross-compiled on the PC, with the GNU-toolchain and gcc3.4.2. For testing ASR on the device, access to executables and to fixed-point speech feature files is through ethernet-NFS. Any computation on the StrongARM produces the exact same results as on a Pentium, but, in a longer time. Real-time recognition of the RM_MFCC-DD_ML fixed-point system on the StrongARM-1100 is shown in FIG. 3, that plots 700 the accuracy as a function of time (normalized by duration of input speech), for different beam-widths (runtime memory use of 7.5 MBytes). Modern embedded systems, with clock rates of 650 MHz, and more than 128 MBytes of RAM, could run in real-time more complex tasks, such as SBCC.

The fixed-point implementation is necessary for embedded ASR: the inventors tested the floating-point decoder, cross-compiled with floating-point software emulation, and it was ≈50 times slower.

The presented fixed-point implementation of the LVCSR decoder, including language models and search, is as accurate as our best floating-point recognizer, in medium and large vocabulary continuous speech recognition tasks, as tested on the Pentium and StrongARM-1100 CPU's.

In addition to the more important motivation discussed in the Introduction, the algorithms are useful to prototype ASR applications in embedded systems. In fact, the decoder fixed-point parameters do not need critical task-dependent calibrations, and the LVCSR language and acoustic models, trained with the standard floating-point algorithms, can be automatically ported to the required fixed-point representation.

TABLE 4

Word accuracy (%) as function of m and v (e = 5) of fixed-point systems RM_MFCC-DD_ML (a) and SBCC_MFCC-HDA-VTLN_MMI (b).

| | v = 8 | v = 7 | v = 6 | v = 5 | v = 4 | v = 3 |
|---|---|---|---|---|---|---|
| | (a) | | | | | |
| m = 8 | 95.6 | 95.7 | 95.6 | 95.5 | 95.5 | 93.2 |
| m = 7 | 95.7 | 95.7 | 95.7 | 95.6 | 95.4 | 93.2 |
| m = 6 | 95.5 | 95.6 | 95.6 | 95.6 | 95.4 | 93.1 |
| m = 5 | 95.4 | 95.4 | 95.5 | 95.4 | 95.3 | 92.9 |
| m = 4 | 94.7 | 94.6 | 94.6 | 94.7 | 94.7 | 91.9 |
| m = 3 | 92.4 | 92.4 | 92.4 | 92.6 | 92.1 | 87.7 |
| | (b) | | | | | |
| m = 8 | 80.6 | 80.5 | 80.5 | 80.2 | 76.6 | 45.6 |
| m = 7 | 80.5 | 80.6 | 80.4 | 80.2 | 76.5 | 45.7 |
| m = 6 | 80.4 | 80.5 | 80.2 | 80.1 | 76.4 | 45.3 |
| m = 5 | 80.3 | 80.2 | 80.1 | 80.0 | 76.3 | 45.0 |
| m = 4 | 77.8 | 78.0 | 77.6 | 77.8 | 74.4 | 44.1 |
| m = 3 | 56.4 | 56.6 | 57.0 | 59.9 | 53.3 | 43.5 |

TABLE 5

Word accuracy (%) as function of e (m = v = 8)
of fixed-point systems RM_MFCC-DD_ML (a) and
SBCC_MFCC-HDA-VTLN_MMI (b).

|     | e = 8 | e = 7 | e = 6 | e = 5 | e = 4 | e = 3 | e = 2 | e = 1 | e = 0 |
|-----|-------|-------|-------|-------|-------|-------|-------|-------|-------|
| (a) | 94.8  | 94.9  | 95.6  | 95.6  | 95.7  | 95.7  | 95.6  | 95.3  | 92.1  |
| (b) | 69.2  | 79.9  | 80.5  | 80.6  | 80.5  | 80.5  | 80.5  | 80.2  | 75.6  |

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
representing arc costs associated with at least one finite-state transducer (FST) in fixed-point by converting floating-point costs of the at least one FST to fixed-point by quantization to yield fixed-point FST arc costs;
representing parameters associated with a hidden Markov model (HMM) in fixed-point to yield fixed-point HMM parameters; and
processing speech data via a processor in a speech recognition decoder using fixed-point arithmetic for the fixed-point FST arc costs and the fixed-point HMM parameters,
wherein at least the fixed-point HMM parameters are based on a Mahalanobis distance calculation, wherein a format for the fixed-point FST arc costs and the fixed-point HMM parameters is type Q-2e, wherein Q-2e is a fixed-point format with 2e bits representing a fractional part and e is a normalized error, and wherein the Mahalanobis distance calculation comprises computing Mahalanobis integer products for each Gaussian mean component of the parameters associated with the HMM, performing a right arithmetic shift for each of the Mahalanobis integer products to yield shifted integer products, and summing the shifted integer products.

2. The method of claim 1, wherein the method is applied for large vocabulary automatic speech recognition.

3. The method of claim 1, wherein the HMM is a phonetic context-dependent acoustic HMM.

4. The method of claim 1, wherein the at least one FST is one of a single CLG FST or distinct C, L and G FSTs, wherein C FST is a model for co-articulation, L FST is a model for a lexicon and G FST is a model for a grammar.

5. The method of claim 1, wherein representing parameters associated with the hidden Markov model (HMM) in fixed-point further comprises:
converting HMM state observation probability density functions to fixed-point format by quantization; and
computing HMM state likelihoods as Q-2e fixed-point numbers.

6. The method of claim 1, wherein representing parameters associated with the hidden Markov model (HMM) in fixed-point further comprises:
converting HMM state duration probabilities to fixed-point by quantization using a fixed-point format of type Q-2e.

7. The method of claim 1, further comprising:
computing, at the decoder, sentence hypothesis probabilities with fixed-point arithmetic as type Q-2e numbers.

8. A computing device that processes data associated with speech processing, the computing device comprising:
a processor;
a first module configured to cause the processor to represent arc costs associated with at least one finite-state transducer (FST) in fixed-point by converting floating-point costs of the at least one FST to fixed-point by quantization to yield fixed-point FST arc costs;
a second module configured to cause the processor to represent parameters associated with a hidden Markov model (HMM) in fixed-point to yield fixed-point HMM parameters; and
a third module configured to cause the processor to process speech data in a speech recognition decoder using fixed-point arithmetic for the fixed-point FST arc costs and the fixed-point HMM parameters,
wherein at least the fixed-point HMM parameters are based on a Mahalanobis distance calculation, wherein a format for the fixed-point FST arc costs and the fixed-point HMM parameters is type Q-2e, wherein Q-2e is a fixed-point format with 2e bits representing a fractional part and e is a normalized error, and wherein the Mahalanobis distance calculation comprises computing Mahalanobis integer products for each Gaussian mean component of the parameters associated with the HMM, performing a right arithmetic shift for each of the Mahalanobis integer products to yield shifted integer products, and summing the shifted integer products.

9. The computing device of claim 8, wherein the computing device performs large vocabulary automatic speech recognition.

10. The computing device of claim 8, wherein the HMM is a phonetic context-dependent acoustic HMM.

11. The computing device of claim 8, wherein the at least one FST is one of a single CLG FST of distinct C, L and G FSTs, wherein C FST is a model for co-articulation, L FST is a model for a lexicon and G FST is a model for a grammar.

12. The computing device of claim 8, wherein the second module configured to cause the processor to represent parameters associated with the hidden Markov model (HMM) in fixed-point further:
  converts HMM state observation probability density functions to fixed-point format by quantization; and
  computes HMM state likelihoods as Q-2e fixed-point numbers.

13. The computing device of claim 8, wherein the second module configured to cause the processor to represent parameters associated with the hidden Markov model (HMM) in fixed-point further:
  converts HMM state duration probabilities to fixed-point by quantization using a fixed-point format of type Q-2e.

14. The computing device of claim 8, further comprising:
  a fourth module configured to cause the processor to compute, at the decoder, sentence hypothesis probabilities with fixed-point arithmetic as type Q-2e numbers.

15. A non-transitory computer-readable medium storing instructions for controlling a computing device to perform steps comprising:
  representing arc costs associated with at least one finite-state transducer (FST) in fixed-point by converting floating-point costs of the at least one FST to fixed-point by quantization to yield fixed-point FST arc costs;
  representing parameters associated with a hidden Markov model (HMM) in fixed-point to yield fixed-point HMM parameters; and
  processing speech data via a speech recognition decoder using fixed-point arithmetic for the fixed-point FST arc costs and the fixed-point HMM parameters,
  wherein at least the fixed-point HMM parameters are based on a Mahalanobis distance calculation, wherein a format for the fixed-point FST arc costs and the fixed-point HMM parameters is type Q-2e, wherein Q-2e is a fixed-point format with 2e bits representing a fractional part and e is a normalized error, and wherein the Mahalanobis distance calculation comprises computing Mahalanobis integer products for each Gaussian mean component of the parameters associated with the HMM, performing a right arithmetic shift for each of the Mahalanobis integer products to yield shifted integer products, and summing the shifted integer products.

* * * * *